United States Patent [19]

Ricciardi

[11] Patent Number: 4,687,070

[45] Date of Patent: Aug. 18, 1987

[54] AUTOMOBILE MANEUVERING DEVICE

[76] Inventor: Russell Ricciardi, 1420 5th Ave., Bay Shore, N.Y. 11706

[21] Appl. No.: 893,715

[22] Filed: Aug. 6, 1986

[51] Int. Cl.$^4$ .............................................. B60P 3/06
[52] U.S. Cl. ...................................... 180/74; 180/19.1
[58] Field of Search ......................... 180/74, 19.1, 221

[56] References Cited

U.S. PATENT DOCUMENTS

| | | | |
|---|---|---|---|
| 4,125,029 | 11/1978 | Krezak et al. | 180/74 |
| 4,289,212 | 9/1981 | Immel | 180/19.1 |
| 4,582,154 | 4/1986 | Englund | 180/74 |
| 4,589,509 | 5/1986 | Chase | 180/74 |

Primary Examiner—John J. Love
Assistant Examiner—Donn McGiehan
Attorney, Agent, or Firm—Marvin Feldman; William J. Eppig

[57] ABSTRACT

An automobile maneuvering device is furnished with a drive wheel and a clamp wheel to engage opposite sides of a rear wheel of an automobile with both the clamp wheel and drive wheel disposed above the ground. The device has a chassis and four transport wheels. A drive mechanism, which is operable by an operator in the driver's seat of the automobile, drives the drive wheel to cause the rear wheel to rotate and in turn move the automobile, with the operator guiding the automobile and device with the steering wheel. The device permits a disabled or poorly-positioned automobile to be accurately and carefully moved, without the need for a tow truck or other assistance vehicle.

12 Claims, 6 Drawing Figures

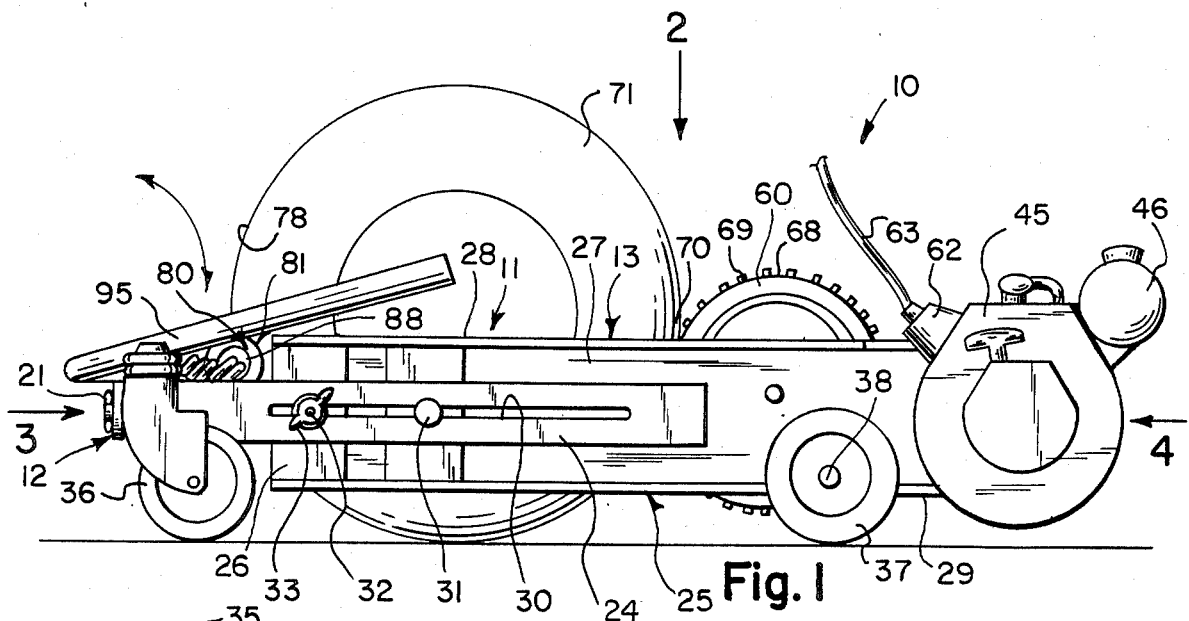
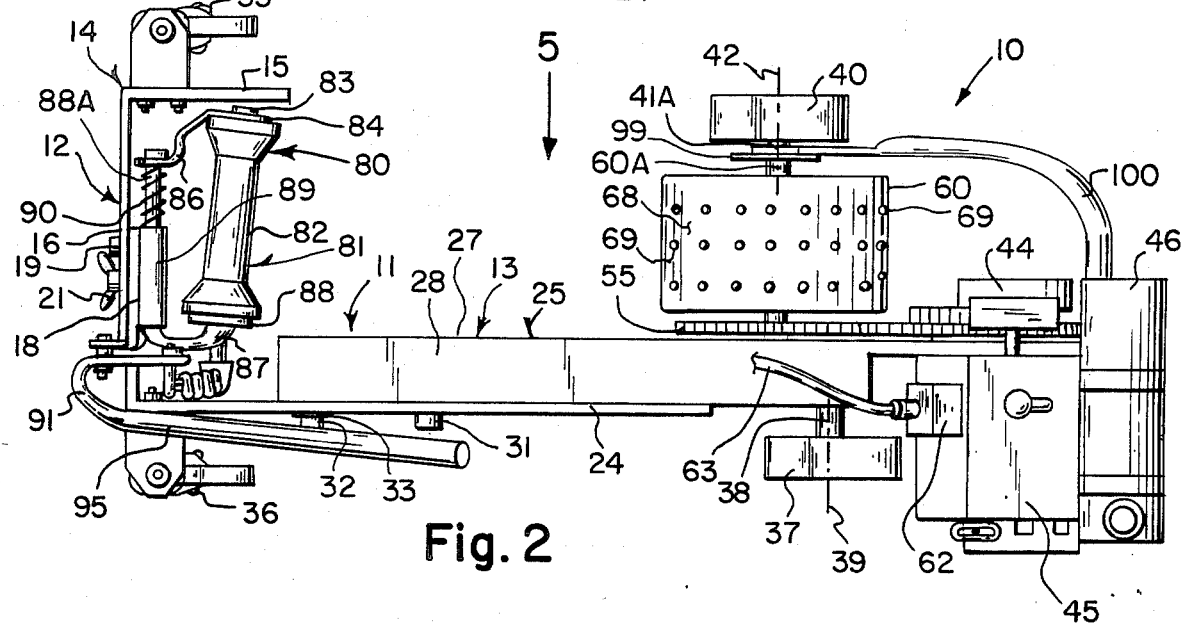
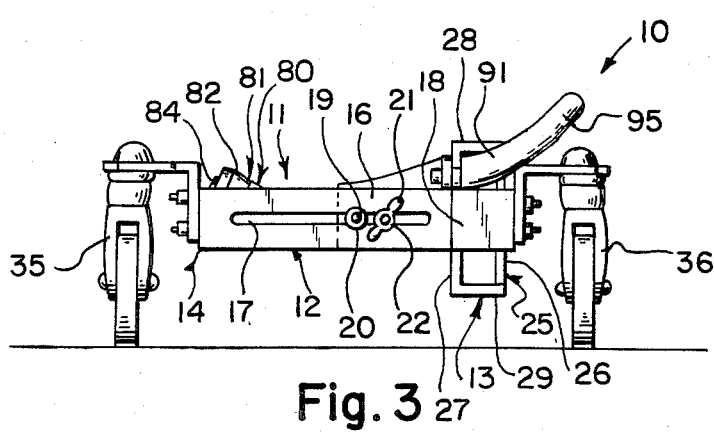
Fig. 1
Fig. 2
Fig. 3

AUTOMOBILE MANEUVERING DEVICE

FIELD OF THE INVENTION

This invention relates to a device for maneuvering an automobile.

BACKGROUND AND DISCUSSION OF THE PRIOR ART

Various devices are known for powering bicycles such as is disclosed in Dinkus, Jr., U.S. Pat. No. 2,552,846, granted May 15, 1951; and Bayard, U.S. Pat. No. 3,439,921, granted Apr. 22, 1969.

It was also known to provide dollies and motorized towing devices for aircraft, such as is disclosed in Baum, U.S. Pat. No. 2,362,981 granted Nov. 21, 1944; Finlay, U.S. Pat. No. 2,751,990, granted June 26, 1956; Wirkkala, U.S. Pat. No. 2,949,972, granted Aug. 23, 1960; and Savidge U.S. Pat. No. 3,025,922, granted Mar. 20, 1962.

The art directed to automobiles did not have a device which permitted the transport and maneuvering of a disabled or poorly positioned automobile which device could be readily operated from the seat of the automobile and be readily transported in the trunk of the automobile or pick-up truck or like vehicle.

DESCRIPTION OF THE DRAWINGS

FIG. 1 is a right side elevational view of the device of the present invention operably engaged to an automobile rear tire;

FIG. 2 is a top plan view of the device of FIG. 1;

FIG. 3 is a front elevation view of the device of FIG. 1;

SUMMARY OF THE INVENTION

Figure 4:
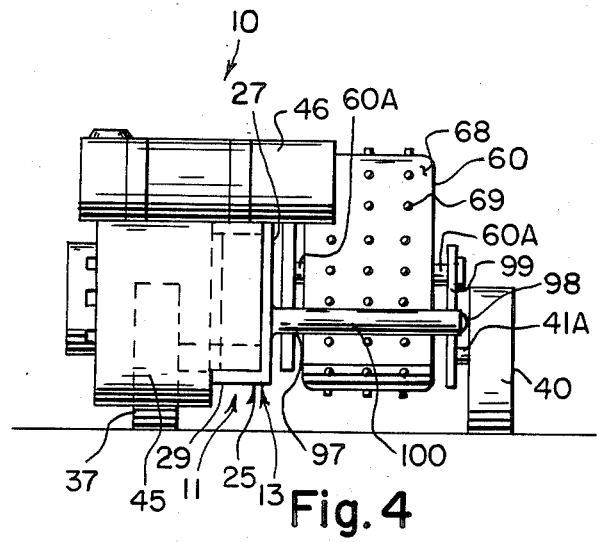
FIG. 4 is a rear elevation view of the device of FIG. 1.
Figure 5:
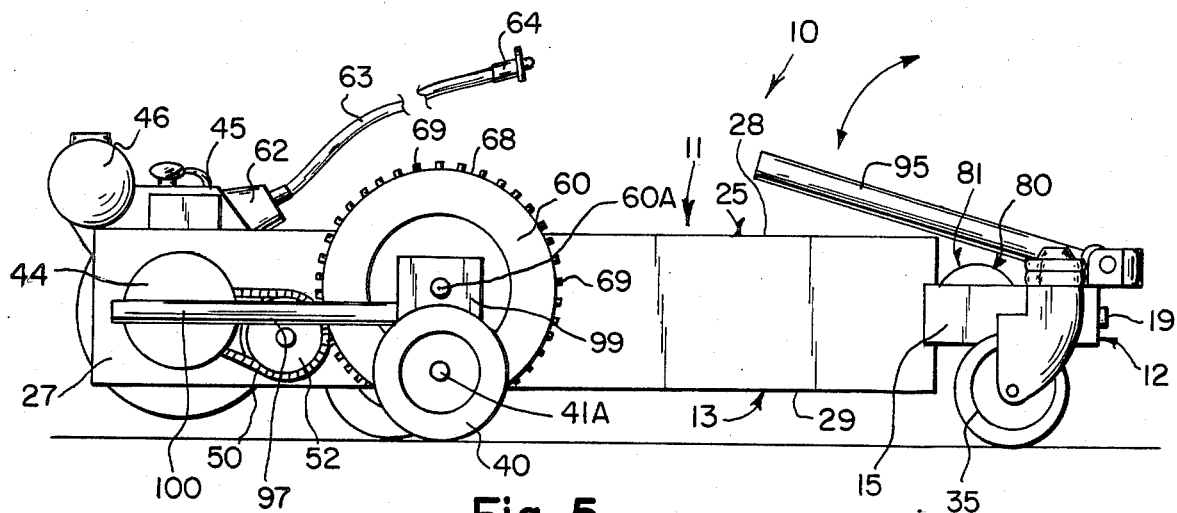
FIG. 5 is a left side elevation view of the device of FIG. 1.
Figure 6:
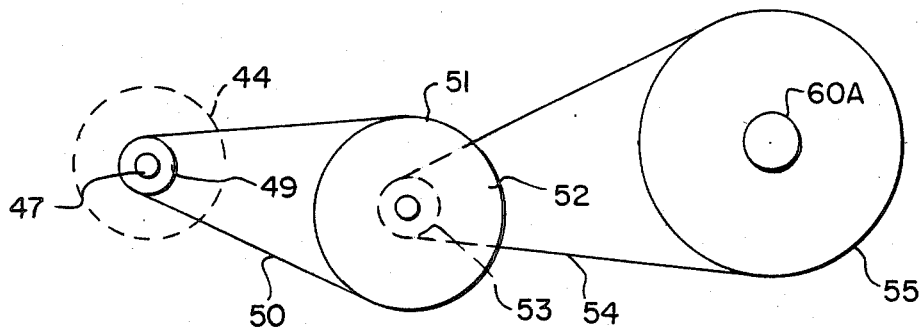
FIG. 6 is a schematic view of the drive system of the device.

A device for maneuvering diverse types of automobiles which includes a chassis with front and rear transport wheels, and a drive wheel for engaging the rear portion of the rear tire on the driver's side, and a spindle clamp for engaging the front portion of the rear tire. A gasoline engine is mounted on the chassis and operably connected through sprockets and chains to the drive wheels. A drive button is remotely operated by the driver from the drivers seat to cause the drive wheel to rotate and in turn drive the rear tire and automobile, which is steered by the user. The device is L-shaped, with the legs of the L being adjustable for ready transport and for fitting differently sized tires.

DESCRIPTION OF THE PREFERRED EMBODIMENT

Referring to the FIGS., there is shown the device of the present invention generally referred to as 10. Device 10 is formed with an approximately L-shaped chassis 11 having front leg or portion 12 and longer side leg or portion 13. Front portion 12 is formed of bracket 14 having inside portion 15, and front bracket 16. Front bracket 16 is formed with elongated slot 17 for purposes hereinafter appearing. Bracket 18 is disposed rearwardly of front bracket 16, and is formed with a pin 19 and washer 20 slidably engaged in slot 17, and using nut 21 and washer 22, which also are slidably engaged in slot 17. Side 13, is formed of bracket 18, side portion 24 and box frame 25. Box frame 25 is formed with an outside or right side 26, and inside or left side 27, top 28, and bottom 29. Side bracket portion 24 is formed wilth an elongated slot 30 for slidably receiving pin 31 and wing nut 32 and washer 33 mounted to box frame side 26.

Front swivel wheels 35 and 36 are mounted to inside portion 15 of leg 12 and side portion 24 of leg 13, respectively. Outside non-swivel back wheel 37 is mounted on axel 38, with axis 39, to frame 25, and inside non-swivel back wheel 40 is mounted on axel 41A having axis 42, with axis 42 being more forewardly disposed than axis 39.

A gasoline engine 45 and gas tank 46 are fixedly mounted to the rear portion of box frame 25. Drive shaft 47 is driven by engine 45 with clutch 44, while shaft 47 having peripheral sprockets 49 is engaged by chain 50, which in turn engages sprockets 51 of wheel 52. Wheel 52 is formed with radially inwardly disposed sprockets 53, which are in turn are engaged by endless chain 54 which engage the sprockets 55 mounted on drive wheel 60. Engine 45 is actuated by starter 62 which is connected by wire 63 to switch or button 64, so that the engine may be actuated by the user from the driver's seat of the automobile.

Drive wheel 60 is formed with an extended resilient periphery 68 formed with radially outwardly extending spikes or members 69 for frictionally engaging the rear portion 70 of automobile tire 71(FIG. 1.).

Drive wheel 60 is oppositely disposed to and operable in conjunction with spring-biased clamp 80. Clamp 80 is formed of spindle 81 having a smoooth flared outer surface 82 for engaging the front portion 78 of rear tire 71. Spindle 81 is rotatably mounted on rod 83 between fixed plates 84 and 88. Plates 84 and 85 are mounted through brackets 86 and 87 respectively, to opposite ends of pivot rod 88A. Rod 88A is formed with sleeve 89 and spring 90. Bracket 91 connects pivot rod 88 to handle or lever 95. With downward movement of handle 95, spring-biased spindle 81 clamps tire 71 between drive wheel 60 and spindle surface 82.

Bracket 97 is fixedly connected to the inside of frame 25 by bolt 98 and bracket 99 which is mounted around axels 41A and 60A (FIG. 4). A hand grip 100 is mounted on bracket 97 for lifting of the device into place. It is important to note that the slot and wing nut construction of the legs of the L-shaped chassis permits the chassis to be reduced in size for ready handling and transportation.

In the aforesaid manner of construction, the user lifts the device from the trunk of the automobile or back of a pick-up truck, by way of example. The user then places the device juxtaposed to the driver's side rear tire of the automobile. The wing nut and slot construction are adjusted to size the device to the rear tire. The user then aligns the tire between the clamps and drive wheel, and pulls the lever downwardly so that the clamp engages the front of the tire and the drive wheel with spokes engaged within tire tread at the rear portion. The user then actuates the switch and engine to drive the drive wheel to rotate the rear tire and consequently move the automobile and in turn move the device. The user or driver may then steer the automoible which in turn "steers" the device through its front swivel wheels.

In the aforesaid manner the automobile may be "driven" and maneuvered to the desired location for repair, or to reposition the automobile, without the use of the automobile engine.

From the foregoing description it will be seen that there is provided a relatively light and easily maneuverable device for automobiles. It is adaptable for parking cars and for moving them. It is a device which considerably conserves the labor necessary for such maneuvering since it permits a single operator to move and steer without the assistance of a tow truck or other vehicle. Its motive power can be derived from an internal combustion engine or, if desired, it could be driven by an electric motor with a battery, although the latter power means may not be as desirable.

Various changes can be made in the form, details and proportions of the various parts without departing from the spirit of the invention, as defined in the claims.

What is claimed is:

1. An automobile maneuvering device comprising:
   a chassis comprising transport wheels for permitting movement of the device along the ground,
   a drive wheel operably rotatably connected to the chassis, and means for rotating the drive wheel, clamp means operably connected to the chassis and spaced from and opposed to the drive wheel, said chassis including means to move the clamp means to engage one portion of an automobile tire with the drive wheel engaged at another portion of the automobile tire, and means to actuate the rotating means, so that with rotation of the drive wheel the automobile tire is rotated and the automobile and device moved along the ground.

2. The device of claim 1, said drive wheel comprising raised members disposed on the periphery of the drive wheel for frictionally engaging the tire tread.

3. The device of claim 1, said mean to actuate the rotating means being remotely positioned from the chassis so that an operator sits in the front seat of the automobile and operates the device while steering the automobile.

4. The device of claim 3, said transport wheels comprising at least one steerable front wheel.

5. The device of claim 1, said drive means comprising a gas engine.

6. The device of claim 1, said clamp means including a spring and a clamp roller to spring bias the roller against a portion of the tire.

7. The device of claim 6, said clamp means further comprising a rotatable lever for positioning the clamp against the tire.

8. The device of claim 1, said transport wheels including two front wheels and two black wheels, and wherein one backwheel is coplanar with the axis of the device drive wheel.

9. The device of claim 8, wherein the front transport wheels comprise means to rotatable mount the front wheels so as to permit cooperative steering movement of the device with steering movement of the automobile.

10. The device of claim 9, wherein the axis of the other back wheel is spaced from said coplane.

11. The device of claim 1, where the chassis is approximately L-shaped, and the clamp means disposed on one leg of the L, and the drive wheel disposed on the other leg of the leg.

12. The device of claim 11, further comprising means to adjust the length of each of the legs of the L.

* * * * *